United States Patent [19]

Piety et al.

[11] Patent Number: 5,185,937
[45] Date of Patent: Feb. 16, 1993

[54] ALIGNMENT BRACKET ASSEMBLY INTEGRITY CHECK AND SAG DETERMINATION

[75] Inventors: Kenneth R. Piety; Daniel L. Nower, both of Knoxville, Tenn.

[73] Assignee: Computational Systems, Inc., Knoxville, Tenn.

[21] Appl. No.: 893,102

[22] Filed: Jun. 3, 1992

[51] Int. Cl.$^5$ ................................................. G01B 5/25
[52] U.S. Cl. ......................................... 33/645; 33/412
[58] Field of Search ................................... 33/645, 412

[56] References Cited

U.S. PATENT DOCUMENTS

| | | | |
|---|---|---|---|
| 3,525,158 | 8/1970 | Torlay | 33/412 X |
| 4,367,594 | 1/1983 | Murray, Jr. | 33/412 X |
| 4,586,264 | 5/1986 | Zatezalo | 33/645 X |

OTHER PUBLICATIONS

*Shaft Alignment Handbook*, J. Piotrowski, Copyright 1986, pp. 101-103.
*Alignment Manual for Horizontal, Flexibly Coupled Rotating Machines*, 3rd Edition, M. Murray, Jr., Copyright 1983, p. 31.
*Total Alignment*, V. R. Dodd, Copyright 1974, pp. I-5, II-6, II-7.
"Coupling Alignment: The Reverse Indicator Method Simplified", Boalm, *P/PM Technology*, Jul./Aug. 1990, pp. 16-23.
"Aligning Shafts—Part 1, Measuring Misalignment", Durkin, *Plant Engineering*, Jan. 11, 1979, pp. 86-90.
"Aligning Shafts—Part 2, Correcting Misalignment", Durkin, *Plant Engineering*, Feb. 8, 1979, pp. 102-105.

*Primary Examiner*—Harry N. Haroian
*Attorney, Agent, or Firm*—Luedeka, Hodges, Neely & Graham

[57] ABSTRACT

Methods for verifying the mechanical integrity of an alignment bracket, particularly a multi-configurable alignment bracket, used for aligning co-rotatable in-line machine shafts, and for determining the amount of alignment bracket "sag" to be accounted for when subsequently employing readings taken with the alignment bracket. The invention employs a previously-established relationship between sag and deflection of the alignment bracket under the influence of a known force to determine sag and to verify mechanical integrity of the alignment bracket in situ, avoiding the need for the usual prealignment sag determination on a separate straight pipe or mandrel. In the practice of the method, the alignment bracket is set up in a position for use, on the actual shafts being aligned. The extension bar of the alignment bracket is positioned above the centerlines of the shafts, and a known force is applied by hanging a known weight at a predetermined point on the alignment bracket. This force results in a deflection of the extension bar, which is measured. From the measured deflection, a sag value is determined based on a previously-determined relationship. To verify integrity of the alignment bracket, measured deflection is preliminarily compared to a range of acceptable deflection values for the particular alignment bracket dimensional configuration.

12 Claims, 1 Drawing Sheet

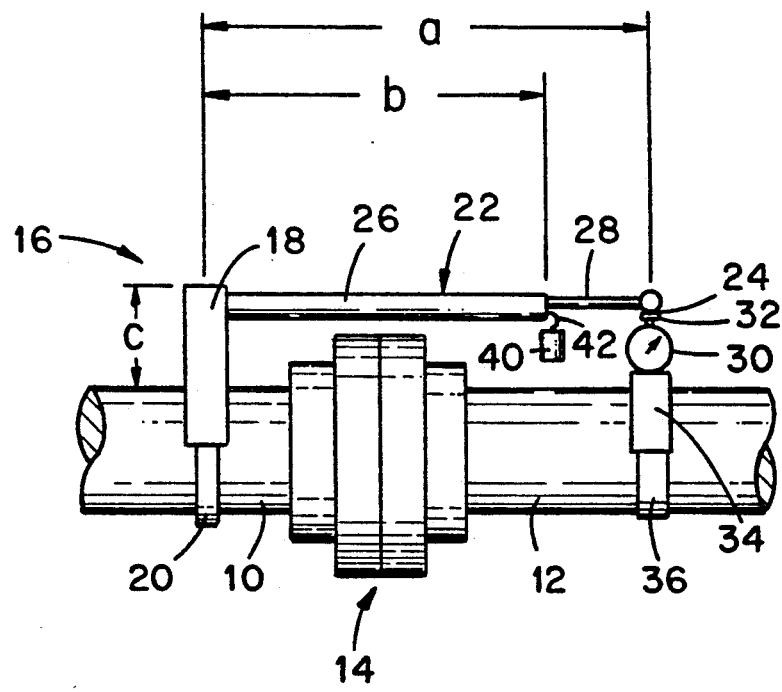

ALIGNMENT BRACKET ASSEMBLY INTEGRITY CHECK AND SAG DETERMINATION

BACKGROUND OF THE INVENTION

The present invention relates generally to the art of aligning co-rotatable in-line machine shafts which are coupled together for operation by means of a shaft coupling. More particularly, the invention relates to methods for evaluating a multi-configurable alignment fixture or bracket to verify mechanical integrity of the alignment bracket, and to determine the amount of "sag" to be accounted for when subsequently employing readings taken with the alignment bracket.

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

A number of shaft alignment methods are known, which generally have in common the use of suitable alignment fixtures, also termed alignment brackets. The alignment brackets are employed to measure particular relative displacements (also termed offsets) as the shafts are rotated together through one revolution, taking readings at various angular positions. Traditionally the shafts are stopped at the 0°, 90°, 180° and 270° angular positions to take readings. However, as disclosed in commonly-assigned related application Ser. No. 07/892,587 filed concurrently herewith by Kenneth R. Piety and Daniel L. Nower and entitled "Shaft Alignment Data Acquisition", the entire disclosure of which is hereby expressly incorporated by reference, readings may be taken at a number of angular positions other than 0°, 90°, 180° and 270°, and in an automated system data may be collected as the shafts are turned smoothly in their normal direction of rotation, such that no counter-rotation is allowed. Each relative displacement is measured between a point referenced to one of the shafts by means of the alignment bracket and a point on the other shaft. Dial indicators are often employed, these dial indicators having a plunger which moves a hand on the face of the dial indicator.

The readings are then used to calculate machine moves which will bring the shafts into alignment. The 0°, 90°, 180° and 270° angular positions at which readings are conventionally taken lie in geometric planes in which either of the machines, for example the motor, may be moved for purposes of alignment. In particular, the mounting bolts of the machine may be loosened, and the machine may be either moved in a horizontal plane, moved in a vertical plane by placing or removing shims under one or more of the feet of the machine, or both. There are well developed calculation methods and procedures known in the art for determining what machine moves to make to achieve an aligned condition based on measurement of relative displacement (offset) data at the 0°, 90°, 180° and 270° positions mentioned.

An alignment bracket typically has a base firmly clamped or otherwise affixed to one shaft, and an extension bar or arm extends laterally from the base in a direction generally parallel to the shafts across the coupling over to a reference point adjacent a point on the periphery of the other shaft. A device for measuring displacement, such as a dial indicator, is positioned so as to measure relative displacement in a radial direction (offset) from the reference point to the point on the periphery of the other shaft as the shafts are rotated together while stopping at the 0°, 90°, 180° and 270° angular positions to take and record readings. The position of the alignment bracket is then reversed so as to be fixedly referenced to the other shaft, establishing a reference point adjacent a point on the periphery of the one shaft, and the procedure is repeated. Alternatively, a pair of alignment brackets may be employed for simultaneous readings.

From the geometry just described, it will be appreciated that the reference point on the alignment bracket attached to the one shaft rotates about the projected centerline (axis of rotation) of the one shaft to define a circle centered on that projected centerline, and vice versa for the other shaft, and that the distance and direction of the distance between the two shaft centerlines as projected can be determined at any transverse plane along the shaft axes. From the thus measured distances and directions of the distances between the two shaft centerlines as projected in two transverse planes, both offset misalignment and angular misalignment components may be calculated.

When readings are taken with the extension bar in an angular position above the shafts or below the shafts, the readings are affected by the amount the brackets sag under the force of gravity due to their weight. To obtain accurate values for misalignment correction, the sag must be subtracted from the measurement before any calculations are made to align the shaft center lines. Bracket sag primarily results from beam deflection of the extension bar, but there can be additional contributions to sag, such as flexibility in the alignment bracket base or in the fastening devices employed to attach the base to the shafts to be aligned. Thus even laser-based alignment brackets which employ beams of light rather than an extension bar are subject to sag to some extent.

It is relevant to note there are a great many specific alignment bracket dimensional configurations which may be achieved, even with a given alignment bracket. Thus, the extension bar may be adjusted to different lengths to suit the particular alignment configuration, and one or more spacer blocks may be employed to space the extension bar in a radial direction away from the shafts in order to provide clearance around a particular coupling. The invention is particularly applicable to such multi-configurable alignment brackets.

In a typical prior art method for measuring sag, the alignment bracket or brackets are set up on a straight segment of pipe deemed to be sufficiently rigid, or on a suitable mandrel, exactly as the bracket is to be later set up during the shaft alignment process. After the brackets are set up, the pipe or mandrel is rotated such that the extension bar of the alignment bracket is above the pipe or mandrel, that is, lying in a vertical plane defined generally by the pipe centerline, which is defined as the 0° shaft angular position. Depending upon the particular type of dial indicator employed, the dial indicator is either zeroed or an absolute reading is taken. Then, the pipe or mandrel is rotated such that the alignment bracket extension bar is below the pipe or mandrel in the 180° angular position, and another reading is taken. Bracket sag is determined from the difference between the two readings.

3

This prior art method suffers a number of disadvantages. Inherently, error can be induced when the alignment brackets are moved from the straight pipe to the actual shafts being aligned. No matter how careful the user is, bolts and clamps tends to be tightened in a different order, and to a different torque. In addition, the brackets may inadvertently be set up at a shorter or longer distance. All of these factors affect the amount of bracket sag.

Another disadvantage is that it is possible to mount the alignment brackets in a manner such that the data measured is inaccurate, particularly brackets that are multi-configuration brackets. This can be caused by not tightening all clamps properly, by damaged brackets, or a defective dial indicator.

SUMMARY OF THE INVENTION

It is an object of the invention to provide an improved method for determining the sag of an alignment bracket employed in the alignment of a pair of co-rotatable in-line shafts.

It is another object of the invention to provide such a method which provides accuracy equal to or greater than previous methods.

It is another object of the invention to provide such a method for determining sag which requires less time than previous methods.

It is yet another object of the invention to provide a method for checking the mechanical integrity of an alignment bracket as positioned for use.

The invention provides a method for determining the sag of an alignment bracket in situ, bypassing the need for setting the alignment bracket up on a straight pipe prior to aligning. The method thus determines sag as the brackets are set up on the machines themselves, for greater accuracy. Moreover, the method provides an integrity check of the entire bracket assembly before any alignment data is taken.

In overview, the invention employs a previously-established relationship between sag and deflection of the alignment bracket under the influence of a known forcing function, which typically is simply a known test weight. The relationship can be derived from theoretical beam deflection equations, or can simply be measured and recorded for a variety of common alignment bracket configurations.

More particularly, the methods of the invention begin with the step of setting up the alignment bracket in a position for use, on the actual shafts being aligned. The base of the alignment bracket is attached to one shaft, and the extension bar extends over to the other shaft. The bracket and shafts are positioned such that the extension bar lies in a vertical plane defined generally by the shaft centerlines, for example, above the shafts in the 0° angular position. It will be appreciated, however, that the same results can be obtained by positioning the alignment bracket with the extension bar at the 180° position.

Next, a known force is applied to the alignment bracket, such as by simply hanging a known weight on the alignment bracket at a predetermined point on the alignment bracket, preferably at a point near the end of the extension bar for maximum leverage. This force results in a relative displacement between a reference point typically at the end of the extension bar and the other shaft. This deflection is then measured, preferably employing the same indicator which is to be subsequently used during the actual alignment procedure.

4

A sag value for the alignment bracket is then determined from the measured deflection based on a previously-determined relationship for the particular dimensional configuration of the alignment bracket. The previously-determined relationship can be recorded in a simple lookup table, or may be embodied in either a theoretically-calculated or empirically derived equation. When a lookup table embodiment is employed, the lookup table has entries for a plurality of different alignment bracket mounting configurations.

In an integrity check aspect of the invention, the measured deflection is compared to a range of acceptable deflection values for the particular alignment bracket dimensional configuration. If the deflection does not fall within the range, the user is thus advised to check the bracket set up.

In a combined method, first the measured deflection is compared to a range of acceptable deflection values. Then, in the event the measured deflection is within the range of acceptable deflection values, the sag value is determined from the measured deflection based on the previously-determined relationship.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawings, in which:

The single drawing FIGURE depicts an alignment bracket applied to a pair of co-rotatable in-line shafts, and a deflection measurement in accordance with the invention.

DETAILED DESCRIPTION

Referring to the single drawing FIGURE, first and second in-line shafts 10 and 12 are coupled to each other by means of a coupling 14. The shafts 10 and 12 are connected to respective machines (not shown) such as a motor driving a pump through the shafts and coupling 14. After the degree of misalignment is measured, one of the machines is moved after loosening its mounting bolts, moving the machines in a horizontal plane, and/or inserting or removing shims under one or more machine feet, all as necessary, to bring the shafts 10 and 12 into an aligned condition, as is well known.

Also shown in the FIGURE, in highly diagrammatic form, is an alignment bracket or fixture, generally designated 16. It will be appreciated that the FIGURE is intended to concisely illustrate th principles and practice of the invention with reference to typical alignment bracket geometry. Further details of alignment bracket construction are disclosed in the above-incorporated application Ser. No. 07/892,587.

The alignment bracket 16, includes a base 18 attachable to one of the shafts, in this example the shaft 10, by means of a suitable clamping device 20, represented as an adjustable strap 20. The strap 20 is representative of any one of a number of clamp-like mechanical attachments, typically including chains, swing links, and various forms of tightening nut arrangements to accommodate various shaft sizes. The alignment bracket 16 also includes an extension bar 22 which extends from the base 18 in a lateral direction along the shafts 10 and 12 to a reference point 24 adjacent the other one of the shafts, in this example adjacent the shaft 12. The particular extension bar 22 depicted comprises two separately-adjustable segments, a relatively-sturdy tubular segment 26 adjustably attached to the base 18, and a relatively shorter tip element segment 28 adjustably attached to the tubular segment 26, the distal end of the tip element segment 28 defining the reference point 24.

Located at the reference point 24 is a dial indicator 30 including a plunger 32. To reduce the weight on the end of the extension bar 22 (which weight would further increase "sag"), the dial indicator 30 is attached to a base-like fixture element 34 firmly affixed to the shaft 12 by means of another clamping device 36 like the clamping device 20. The plunger 32 of the dial indicator engages the tip element segment 28. The dial indicator 30 may alternatively be attached to the tip element segment 28, with the plunger engaging the fixture element 34. Although a dial indicator 30 is illustrated, any suitable measuring device may be employed. In the case of an automated system, a suitable transducer is employed which produces data signals.

It will be appreciated that the distance between the reference point 24 and the shaft 12 varies in a radial direction as the shafts 10 and 12 are rotated together. The resultant relative displacement as a function of angular position is measured and indicated by the dial indicator 30 or other measuring device.

Alignment brackets such as the alignment bracket 16, may be assembled in a variety of dimensional configurations to suit various specific alignment situations. In particular, the overall length of the extension bar 22, indicated as dimension "a", is adjustable by means of suitable sliding clamping arrangements (not shown), for example to adapt to couplings 14 of various axial extents. Likewise, the radial distance of the extension bar 22 from the shafts 10 and 12, indicated as dimension "c", is adjustable, for example to clear couplings 14 of various diameters. Typically, adjustment of dimension "c" is accomplished by installing one or more spacers (not shown) as part of the base element 18.

In the method of the invention, the alignment bracket 16 is set up in a position for use, with the extension bar 22 lying in a vertical plane defined generally by the centerlines of the shafts 10 and 12. In the FIGURE, the extension bar 20 is positioned above the shafts 10 and 12.

A known force is then applied to the alignment bracket 16, such as by hanging a known weight 40 from the extension bar 22 at a predetermined point 42, spaced a distance "b" from the base element 18. In this example, the predetermined point 42 is, for convenience, located at the end of the tubular segment 26 where the tip element segment 28 is attached. The resultant deflection of the alignment bracket 16, including beam deflection of the extension bar 22 and any flexing in the base 18 and its mounting 20, are measured at the reference point 24, by means of the dial indicator 30. Thus, "before" and "after" dial indicator readings are taken prior to and after application of the known weight 40, and subtracted. Alternatively, the dial indicator 30 may be "zeroed" prior to application of the known weight 40, and simply read directly thereafter.

Although the invention is illustrated and described herein with emphasis on a manual method, it will be appreciated that this description is for clarity only, and that the invention may readily be implemented in an automated system employing computer-based data acquisition techniques. Also, while the invention is illustrated with reference to an alignment bracket having an extension bar 22, it will be appreciated that beam deflection of the extension bar 22 is not the only cause of sag, and even optically-based alignment brackets are subject to sag, and in addition are subject to the possibility of an insecure attachment.

In general, the mechanical integrity of the bracket is verified and the value of sag for the particular dimensional configuration of the alignment bracket is determined from the measured deflection based on a previously-determined relationship, which conveniently may be recorded in a TABLE such as appears hereinbelow by way of example. For each expected dimensional configuration, the TABLE includes an entry for average measured deflection, an entry for the acceptable interval of variation, and average bracket sag. For each bracket configuration, when measured deflection is within the acceptable interval of variation, there is a generally linear relationship between actual measured deflection and actual bracket sag, which can be determined and recorded for subsequent use.

In an overview of use, first the measured deflection is compared against the acceptable interval of variation to establish the mechanical integrity of the bracket set up. Then the sag of the alignment bracket 16 for the specific dimensional configuration is determined by using the measured deflection value, along with dimensions "a", "b" and "c" to predict the corresponding sag value based on the TABLE, utilizing the previously-determined linear relationship. This value of sag is the value which will be employed in subsequent calculations to determine machine moves to bring the shafts 10 and 12 into alignment.

By way of example, reproduced below is an excerpt from a sag lookup table.

TABLE

| Dimension (inches) | | | Average Measured Deflection | Acceptable Variation in Deflection | Average Bracket |
| --- | --- | --- | --- | --- | --- |
| a | b | c | (mils) | (mils) | Sag (mils) |
| 10.5 | 9 | 5 | 1.5 | ±0.5 | 1.5 |
| 10.5 | 9 | 6 | 2.0 | ±0.5 | 1.5 |
| 10.5 | 9 | 7 | 2.5 | ±0.5 | 2 |
| 10.5 | 9 | 8 | 3 | ±0.5 | 2.5 |
| . | . | . | . | . | . |
| 12 | 9 | 5 | 3 | ±1.0 | 2.5 |
| 12 | 9 | 6 | 3.5 | ±1.0 | 2.5 |
| 12 | 9 | 7 | 3.5 | ±1.0 | 3.0 |
| 12 | 9 | 8 | 4 | ±1.0 | 3.5 |
| . | . | . | . | . | . |
| 16.25 | 15 | 5 | 9.0 | ±1.5 | 7.5 |
| 16.25 | 15 | 6 | 11.5 | ±1.5 | 9.5 |
| 16.25 | 15 | 7 | 13.5 | ±1.5 | 11.5 |
| 16.25 | 15 | 8 | 15.0 | ±1.5 | 13.0 |
| . | . | . | . | . | . |
| 18.125 | 15 | 5 | 10.5 | ±2.0 | 10.0 |
| 18.125 | 15 | 6 | 12.5 | ±2.0 | 11.5 |
| 18.125 | 15 | 7 | 14.0 | ±2.0 | 12.5 |
| 18.125 | 15 | 8 | 15.5 | ±2.0 | 13.5 |

The foregoing table is a simplified version wherein, for each bracket configuration, as defined by dimensions "a", "b" and "c", there is an average measured deflection in mils (column four), an acceptable interval of variation in mils (column five) and an average bracket sag value (column six), also in mils, to be used in subsequent calculations. In this particular table, each configuration has only one measured deflection value. However, in practice, it will be appreciated that, for each configuration as defined by the dimensions "a", "b" and "c", actual measured deflection may have a particular value which is close to, but not exactly the same as, the measured deflection entry per the table. Such a difference, for example, may result in slight variations in the dimensions "a", "b" and "c" dependent upon the particular bracket setup, and other inevitable tolerance variations. In such cases, a particular sag value is determined from the measured deflection by taking the table value and adjusting by a correction factor, which is determined in any suitable manner, such as simple linear interpolation.

Another feature of the above table is that, for a given bracket configuration as specified by dimensions "a", "b" and "c", the measured deflection entry in column four may be viewed as an expected value. Actual measured deflection may vary from the table value, such as within a range of ±1.0 mil, or other previously-determined range, which is termed a range of acceptable values. The range may also be expressed as a percentage. In the event the actually measured deflection falls outside this range, the user knows that there is a problem with alignment bracket integrity, which problem must be corrected before proceeding.

The following two examples illustrate the practice of the invention.

In a first example, the bracket 16 is set up as indicated in the FIGURE, with a dimension "a" of 18.125 inches, a dimension "b" of 15 inches, and a dimension "c" of 5 inches. The known weight 40 was hung at the point 42, and the resultant deflection measured to be 10.5 mils. The measured deflection in this case agrees with the deflection value in the table, and a sag value of 10.0 mils is used, without further adjustment, in subsequent alignment calculations in the manner well known in the art. Had the measured deflection been 10.6 mils, well within ±2.0 mils of 10.5 mils, then a slightly different value for sag would be employed, dependent upon a previously-established relationship for the particular configuration which would be a value slightly less than 10.1 mils.

In any event, with this agreement between the measured deflection value and the table, the integrity of the bracket 16 setup is indicated as satisfactory, and the value of sag to be used for subsequent machine move calculations is 10.0 mils.

In a second example, the bracket 16 is set up with a dimension "a" of 12.0 inches, a dimension "b" of 9 inches, and a dimension "c" of 8 inches. The deflection was measured to be 8.5 mils. From the table, the measured deflection should have been 4 mils. The measured deflection in this case does not agree with the deflection value in the table, and is well outside of a range of acceptable deflection values. The user is accordingly advised that the bracket 16 is not set up properly. In this particular example, upon inspection, a clamp for the extension bar 22 was found to be loose. After tightening, a deflection of 4.5 mils was measured, which is within the range of acceptable values for this particular configuration (in this case, the range of acceptable values ±1.0 mil). The value of sag for machine move calculations is accordingly 3.5 mils, plus a further correction factor based on the actual measured deflection.

In view of the foregoing, it will be appreciated that the present invention saves time by avoiding the need for a prealignment sag determination on a separate pipe or mandrel, eliminates error induced by remounting an alignment bracket on machine shafts after determining sag on a separate pipe or mandrel, and provides an integrity check of the alignment bracket as mounted to ensure the acquisition of accurate alignment data.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for determining the sag of an alignment bracket employed in the alignment of a pair of co-rotatable in-line shafts, the alignment bracket being of the type which includes a base attachable to one of the shafts and a measurement device for measuring relative displacement between a reference point referenced to the one shaft and the other one of the shafts at a plurality of angular positions, said method comprising the steps of:
   setting up the alignment bracket in a position for use;
   applying a known force to the alignment bracket;
   measuring the resultant deflection of the alignment bracket at the reference point; and
   determining a sag value from the measured deflection based on a previously-determined relationship.

2. A method in accordance with claim 1, wherein the step of applying a known force comprises hanging a known weight on the alignment bracket at a predetermined point on the alignment bracket.

3. A method in accordance with claim 1, wherein the step of determining a sag value from the measured deflection comprises employing a previously-generated lookup table.

4. A method in accordance with claim 3, wherein the step of determining a sag value from the measured deflection comprises employing a previously-generated lookup table having entries for a plurality of different alignment bracket mounting configurations.

5. A method for checking the mechanical integrity of an alignment bracket employed in the alignment of a pair of co-rotatable in-line shafts, the alignment bracket being of the type which includes a base attachable to one of the shafts and a measurement device for measuring relative displacement between a reference point referenced to the one shaft and the other one of the shafts at a plurality of angular positions, said method comprising the steps of:
   setting up the alignment bracket in a position for use;
   applying a known force to the alignment bracket;
   measuring the resultant deflection of the alignment bracket at the reference point; and
   comparing the measured deflection to a range of acceptable deflection values.

6. A method in accordance with claim 5, wherein the step of applying a known force comprises hanging a known weight on the alignment bracket at a predetermined point on the alignment bracket.

7. A method in accordance with claim 5, wherein the step of comparing the measured deflection to a range of acceptable deflection values comprises employing a previously-generated lookup table.

8. A method in accordance with claim 7, wherein the step of comparing the measured deflection to a range of acceptable deflection values comprises employing a previously-generated lookup table having entries for a plurality of different alignment bracket mounting configurations.

9. A method for determining the sag of and checking the mechanical integrity of an alignment bracket employed in the alignment of a pair of co-rotatable in-line shafts, the alignment bracket being of the type which includes a base attachable to one of the shafts and a measurement device for measuring relative displacement between a reference point and the other one of the shafts at a plurality of angular positions, said method comprising the steps of:

setting up the alignment bracket in a position for use;
applying a known force to the alignment bracket;
measuring the resultant deflection of the alignment bracket at the reference point;
comparing the measured deflection to a range of acceptable deflection values; and
in the event the measured deflection is within the range of acceptable deflection values, determining a sag value from the measured deflection based on a previously-determined relationship.

10. A method in accordance with claim 9, wherein the step of applying a known force comprises hanging a known weight on the alignment bracket at a predetermined point on the alignment bracket.

11. A method in accordance with claim 9, wherein the step of comparing the measured deflection to a range of acceptable deflection values and of determining a sag value from the measured deflection comprises employing a previously-generated lookup table.

12. A method in accordance with claim 11, wherein the steps of comparing the measured deflection to a range of acceptable deflection values and of determining a sag value from the measured deflection comprises employing a previously-generated lookup table having entries for a plurality of different alignment bracket mounting configurations.

* * * * *